United States Patent [19]

Kobayashi

[11] Patent Number: 4,499,554
[45] Date of Patent: Feb. 12, 1985

[54] ELECTRONIC TRANSLATING APPARATUS WITH EXTENDED MEMORY

[75] Inventor: Saburo Kobayashi, Tokyo, Japan

[73] Assignee: Casio Computer Co., Ltd., Tokyo, Japan

[21] Appl. No.: 366,198

[22] Filed: Apr. 7, 1982

[30] Foreign Application Priority Data

Apr. 17, 1981 [JP] Japan .............................. 56-57886

[51] Int. Cl.³ ............................................ G06F 15/38
[52] U.S. Cl. .................................................. 364/900
[58] Field of Search ... 364/200 MS File, 900 MS File, 364/419

[56] References Cited

U.S. PATENT DOCUMENTS

| 4,130,882 | 12/1978 | Swanstrom et al. | 364/900 |
|---|---|---|---|
| 4,158,236 | 6/1979 | Levy | 364/900 |
| 4,218,760 | 8/1980 | Levy | 364/900 |
| 4,373,192 | 2/1983 | Yanagiuchi et al. | 364/900 |
| 4,383,307 | 5/1983 | Gibson | 364/900 |
| 4,393,460 | 7/1983 | Masuzawa et al. | 364/900 |
| 4,393,462 | 7/1983 | Tanimoto et al. | 364/900 |
| 4,412,305 | 10/1983 | Yoshida | 364/900 |
| 4,417,319 | 11/1983 | Morimoto et al. | 364/900 |
| 4,420,816 | 12/1983 | Yoshida | 364/900 |
| 4,420,817 | 12/1983 | Yoshida | 364/900 |

Primary Examiner—Raulfe B. Zache
Attorney, Agent, or Firm—Frishauf, Holtz, Goodman and Woodward

[57] ABSTRACT

An electronic translating machine with an extended memory includes a basic memory for storing a number of codes corresponding to words constituting a dictionary in a predetermined order, and an extended memory which is arranged separately from the basic memory and which stores in a predetermined order codes corresponding to words different from the codes stored in the basic memory. When addresses are accessed, the code of a corresponding word is read out from the basic memory and the code of a corresponding word is also read out from the extended memory. These codes are compared in a comparator in a control stage of a control circuit. The comparator selects one code according to a predetermined order. The words of the codes read out from the basic memory and the extended memory are sequentially displayed at a display section in the order of words listed in a dictionary.

6 Claims, 12 Drawing Figures

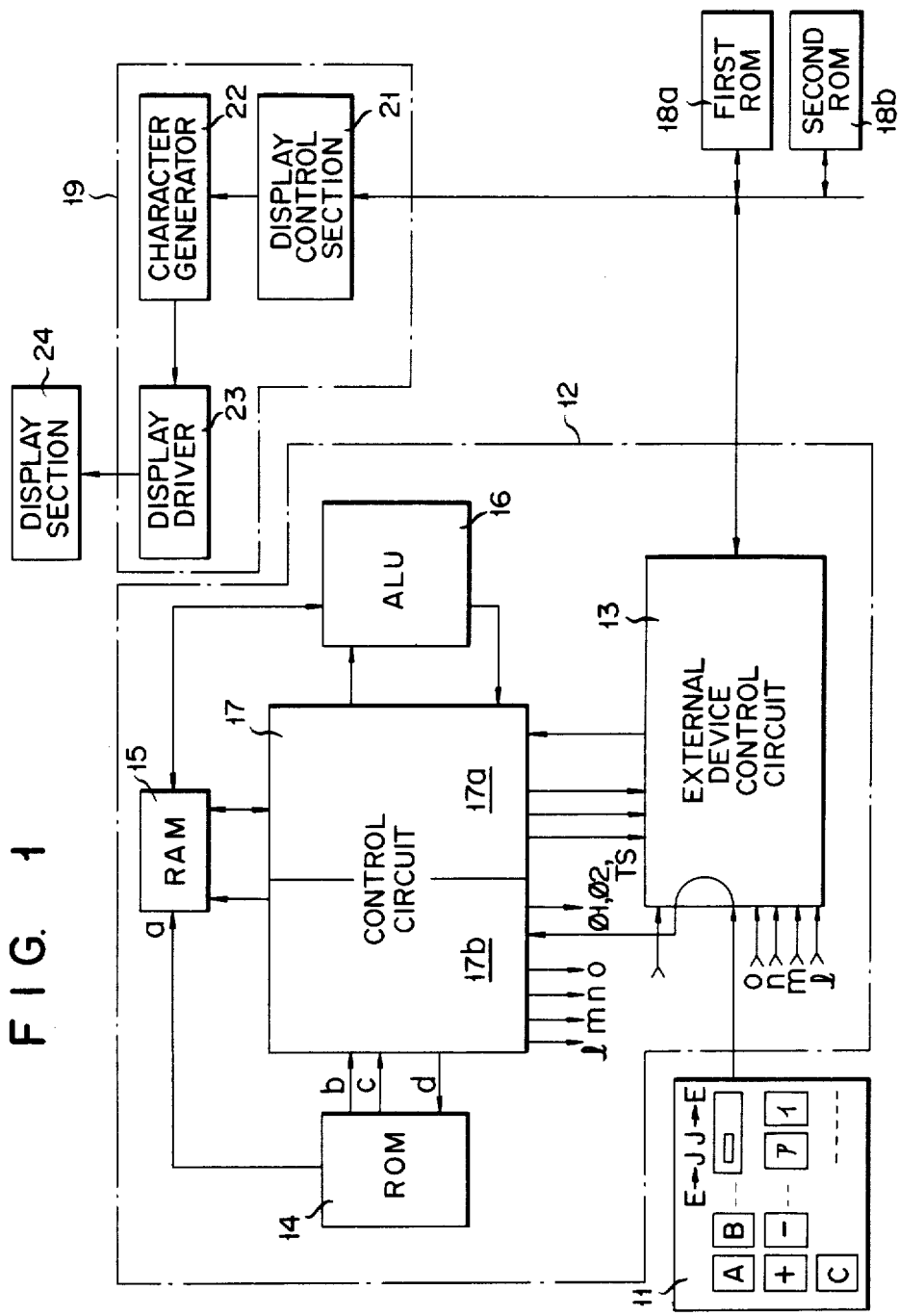
F I G. 1

| FIRST ROM 18a | SECOND ROM 18b |
|---|---|
| 1 アイ | 1 アイサツ |
| 2 アイダ゛ | 2 アイサッスル |
| 3 アイダ゛ノ | 3 アイスル |
| ⋮ | ⋮ | ness
ELECTRONIC TRANSLATING APPARATUS WITH EXTENDED MEMORY

BACKGROUND OF THE INVENTION

The present invention relates to an improvement in an electronic translating apparatus having a basic memory for storing basic words and an extended memory for storing additional words.

Conventionally, electronic translating apparatuses for translating Japanese words and phrases into English words and phrases, and vice versa have been commercially available. Some of the translating apparatuses of this type have an extended memory to increase the capacity of word storage. However, in the conventional translating apparatus with the extended memory, basic words in the basic memory are searched from A to Z with a search key. If a desired word is not stored in the basic memory, the additional words in the extended memory must then be searched from A to Z. The desired word is then read out from the extended memory. Therefore, even if the desired word is stored at the beginning of the extended memory, the basic words in the basic memory must be searched first from A to Z, resulting in an unnecessary, time-consuming search.

SUMMARY OF THE INVENTION

The present invention has been made to solve the above problem and has for its object to provide an electronic translating apparatus with an extended memory for storing additional words, wherein a basic word and an additional word are alternately read out and compared to search a desired word on the basis of an order of words listed in a regular dictionary.

In order to achieve the above object of the present invention, there is provided an electronic translating apparatus with an extended memory, comprising: a basic memory for storing in a predetermined order a number of codes corresponding to words which constitute a dictionary; an extended memory which is arranged separately from said basic memory and which stores in a predetermined order codes corresponding to words different from the codes stored in said basic memory; address designating means, connected to said basic memory and said extended memory, for designating the address at which the codes of a word to be read out is stored; means for comparing the codes of words read out from said basic and extended memories, respectively, on the basis of the address designated by said address designating means and for selecting the code of a word from one of said basic and extended memories according to a predetermined order; and means, connected to said selecting means, for displaying the word of a selected code.

In the electronic translating apparatus with the above arrangement according to the present invention, the codes of words stored in the basic and extended memories are alternately read out and compared. The desired word is thus searched from the words the codes of which are stored in these memories in the order of words listed in the dictionary, thus accomplishing an efficient search in a short period of time.

BRIEF DESCRIPTION OF THE DRAWINGS

FIG. 1 is a block diagram of an electronic translating apparatus according to one embodiment of the present invention;

DETAILED DESCRIPTION OF THE PREFERRED EMBODIMENTS

Figure 2:
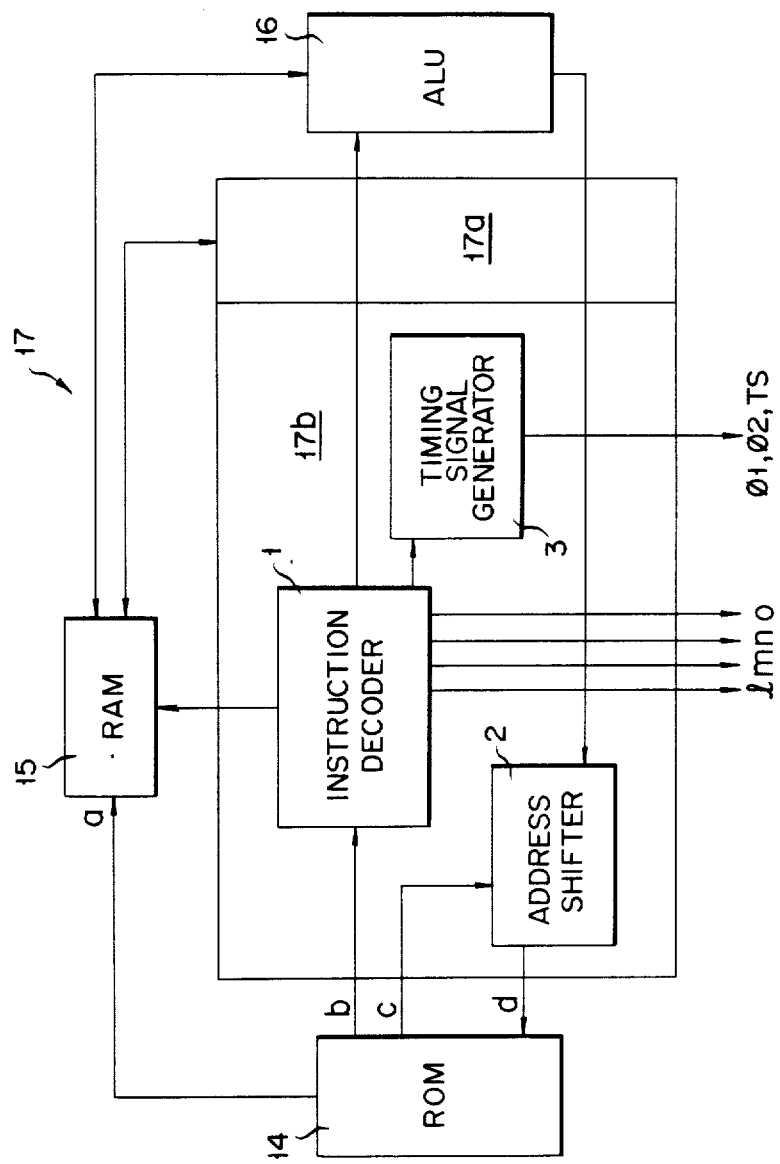
FIG. 2 is a detailed block diagram of a control circuit 17b of FIG. 1.

Referring to FIG. 1, a keyboard 11 has a mode switch, letter keys, kana character keys, a search key, a translation key and so on. Key input data is supplied to a CPU 12. The CPU 12 comprises an external device control circuit 13 for controlling external circuits such as memories and a display unit, a ROM (read-only memory) 14 for storing various control programs, a RAM (random access memory) 15 for storing key input data, ROM readout data and so on, an ALU (arithmetic and logic unit) 16 which is connected to the RAM 15 and which performs arithmetic operation, and a control circuit 17 which is divided into two control stages 17a and 17b and connected to the ROM 14, the RAM 15, the ALU 16 through bus lines, respectively, to control them. The ROM 14 has output bus lines a, b, c and d. The ROM 14 supplies address data to the RAM 15 through the output bus line a. The ROM 14 supplies various instruction signals and a next-address designating signal to the control stage 17b through output bus lines b and c. In response to an instruction received through the line b, the control stage 17b controls the read/write operation of the RAM 15 and the add/subtract operation of the ALU 16. Further, the control circuit 17 and the external device control circuit 13 exchange data therebetween. As shown in FIG. 2, the control stage 17b includes an instruction decoder 1 for receiving various instruction signals output through the output bus line b of the ROM 14, an address shifter 2 which receives a designating signal for designating the next address of the ROM 14 and which supplies a signal for designating the next address of the ROM 14 through the output bus line d according to calculated results from the ALU 16, and a timing signal generator 3 which receives an output from the instruction decoder 1 and which generates clock pulses $\phi 1$ and $\phi 2$ and a timing signal Ts.

Figure 3:
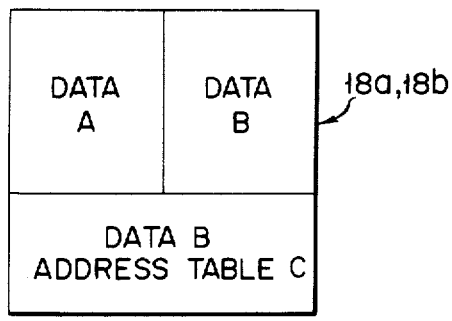
FIG. 3 is a view showing data storage areas of a first ROM 18a or a second ROM 18b of FIG. 1.

The external device control circuit 13 receives key input signals entered by the keyboard 11 which is arranged external to the CPU 12 and controls mutual operation among a first ROM 18a as a basic memory, a second ROM 18b as an extended memory and a display control unit 19. Translation data is stored in the first and second ROMs 18a and 18b. The translation data consists of English words and phrases from A to Z and Japanese words corresponding thereto. The English words are coded in the order of A to Z and the corresponding coded Japanese words are stored in the first and second ROMs 18a and 18b. As shown in FIG. 3, each ROM consists of a first memory region which stores data A corresponding to English words, a second memory region which stores data B corresponding to Japanese words, and a third memory region which stores an address table C of data B. English words are arranged alphabetically, while Japanese words are stored at random, even though Japanese words correspond to alphabetically arranged English words. Therefore, as described above, the address table is arranged to search Japanese words in the order of the kana syllabary. Data stored in the first and second ROM 18a and 18b is read out and input to the CPU 12 through the external device control circuit 13 in response to an input signal from the keyboard 11. Data to be displayed is then supplied to the display control unit 19. The display control unit 19 comprises a display control section 21 for temporarily storing display data, a character generator 22 for generating a dot pattern corresponding to data stored in the display control section 21, and a display driver 23 for driving a display section 24 according to dot pattern data generated from the character generator 22. The display section 24 comprises a dot matrix electrode pattern using, for example, liquid crystal display elements. Characters are thus displayed in the dot matrix pattern.

Figure 4:
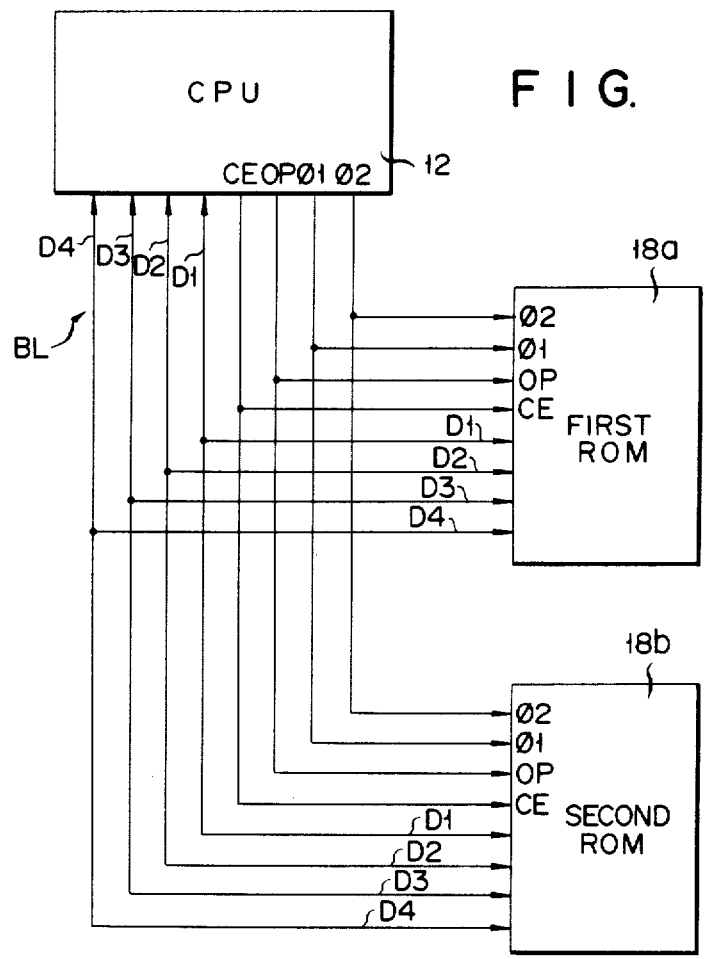
FIG. 4 is a block diagram showing connections between a CPU 12 and the first and second ROMs 18a and 18b of FIG. 1.

FIG. 4 shows connections among the CPU 12, the first ROM 18a and the second ROM 18b. The CPU 12 supplies the clock pulses $\phi 1$ and $\phi 2$, an operation signal OP, and a chip enable signal CE to the external circuits including the first and second ROM 18a and 18b through bus lines BL. At the same time, the CPU 12 exchanges 4-bit data with the external circuits through the lines D1, D2, D3 and D4. When the operation signal OP is supplied from the CPU 12, the 4-bit data serves as an instruction.

Figure 5:
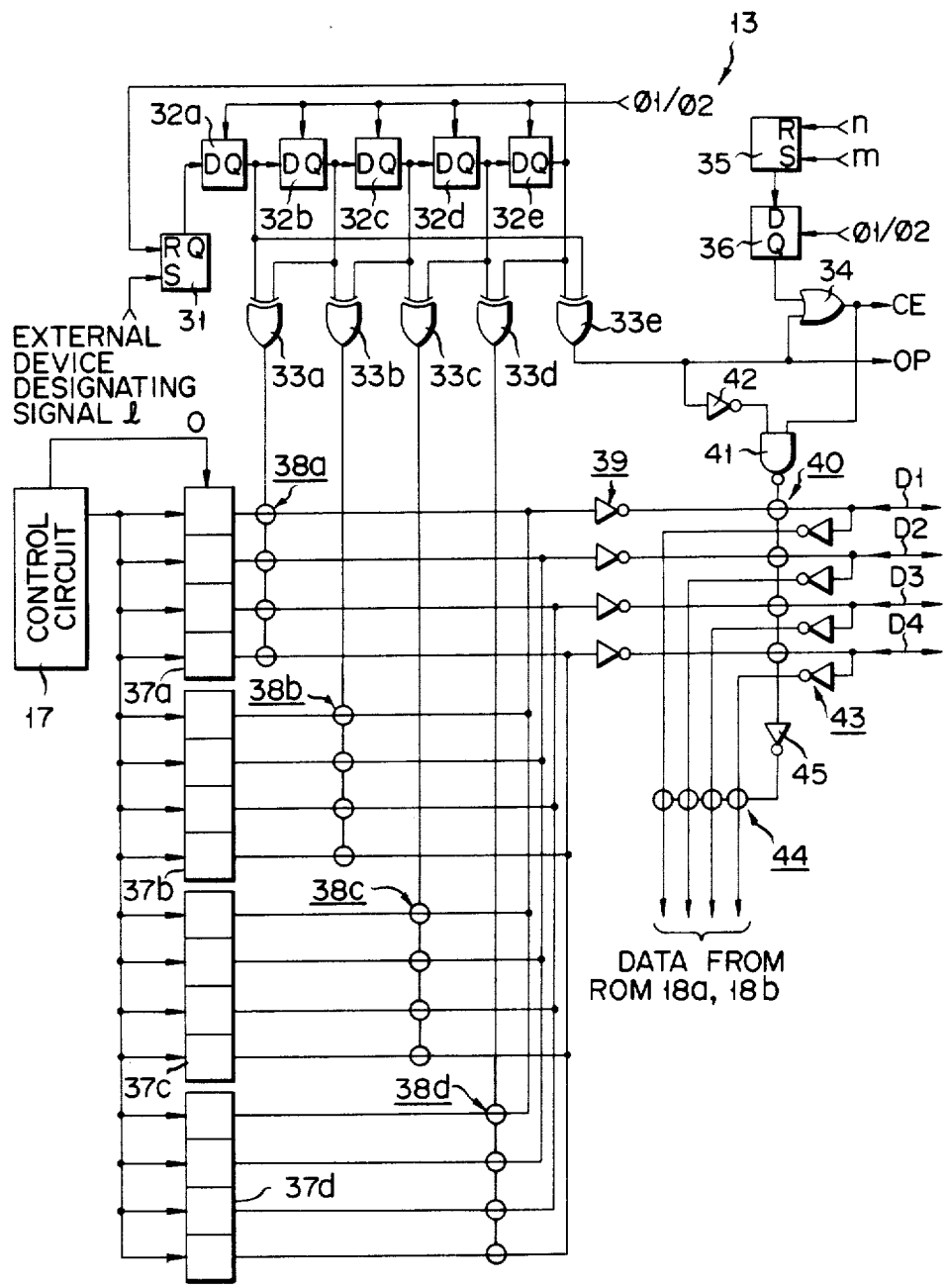
FIG. 5 is a detailed circuit diagram of an external device control circuit 13 of FIG. 1.

The external device control circuit 13 in the CPU 12 will be described in detail with reference to FIG. 5. The flip-flop 31 is set by an external device designating signal l from the control stage 17b. An output is supplied from the Q output terminal of the flip-flop 31 to a delayed flip-flop 32a among series-connected flip-flops 32a to 32e. The delayed flip-flops 32a to 32e receive data synchronously with the clock pulse $\phi 1$. They output data synchronously with the clock pulse $\phi 2$. The outputs from the delayed flip-flops 32a to 32e are supplied to exclusive OR circuits 33a to 33e (to be referred to as EX-OR circuits for brevity hereinafter). Further, the output from the delayed flip-flop 32e is supplied to a reset terminal R of the flip-flop 31. The outputs from the delayed flip-flops 32b to 32e are also input to the EX-OR circuits 33a to 33d. The output from the delayed flip-flop 32a is also supplied to the EX-OR circuit 33e. An output from the EX-OR circuit 33e is produced as the operation signal OP and also supplied to an OR circuit 34. The OR circuit 34 then produces the chip enable signal CE. A flip-flop 35 is set by a data input signal m from the control stage 17b and reset by a data input inhibit signal n therefrom. An output from the flip-flop 35 is supplied to a delayed flip-flop 36 operative in response to the clock pulses $\phi 1$ and $\phi 2$. This output is supplied to the OR circuit 34 which then produces the chip enable signal CE.

Registers 37a to 37d are of 4-bit arrangement and designate external devices. A device code for selecting and designating an external device is loaded from the control circuit 17 into the register 37a. Data for the external devices such as column addresses for the ROMs 18a and 18b is loaded in the registers 37b to 37d. Data retained in the registers 37a to 37d is sequentially read out through gate circuits 38a to 38d which are turned on/off in response to the outputs from the EX-OR circuits 33a to 33d. This data is then supplied to the first and second ROMs 18a and 18b through inverters 39, gate circuits 40 and the lines D1 to D4. The gate circuits 40 are controlled by an output from a NAND circuit 41. The output from the OR circuit 34 is supplied to the NAND circuit 41. The NAND circuit 41 also receives the output from the EX-OR circuit 33e through an inverter 42. Data supplied from the first and second ROMs 18a and 18b through the lines D1 to D4 is supplied to the CPU 12 through the inverters 43 and the gate circuits 44 of the external device control circuit 13. The gate circuits 44 are controlled by the signal from the NAND circuit 41 through an inverter 45.

Figure 6:
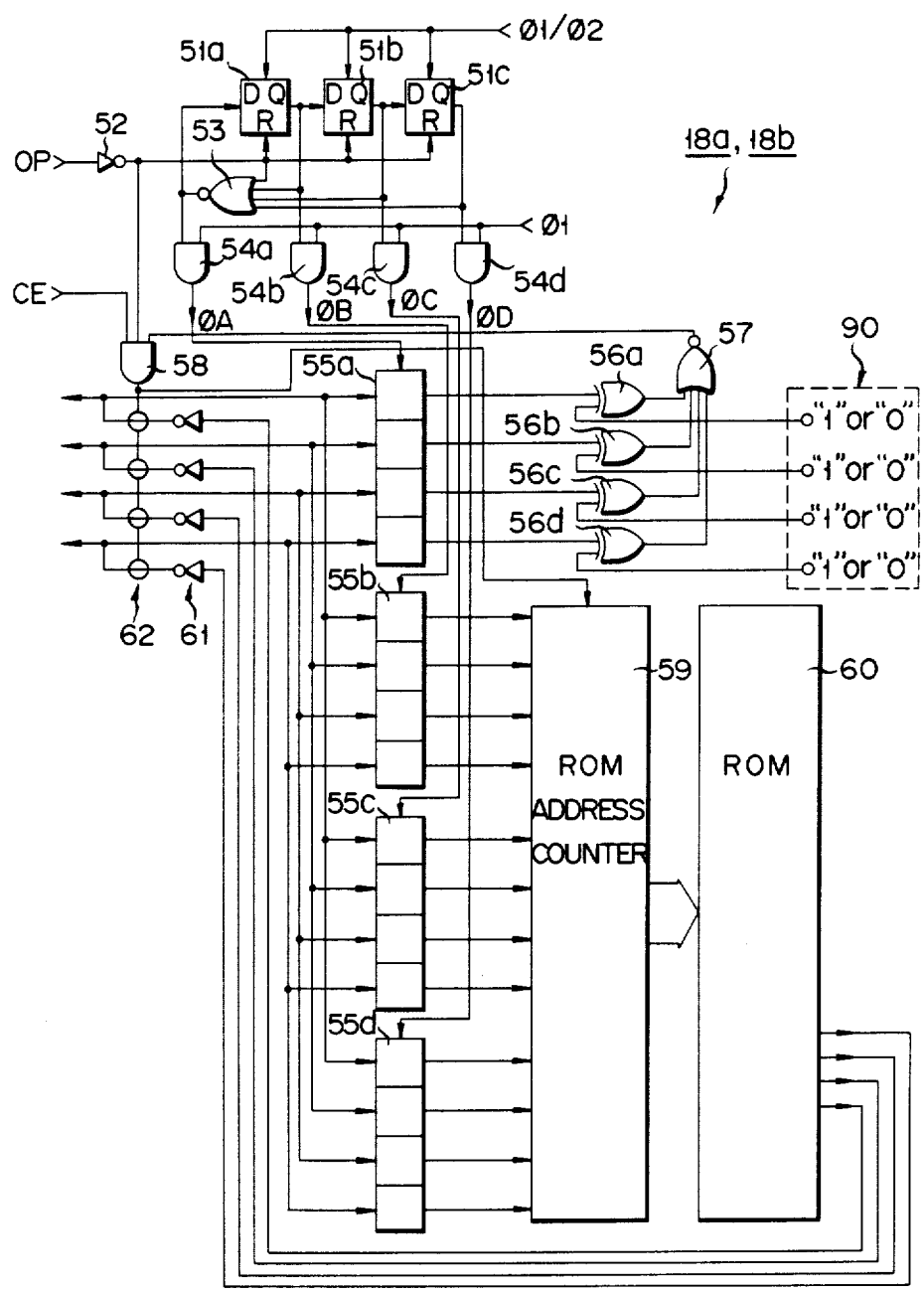
FIG. 6 is a detailed circuit diagram of the first and second ROMs 18a and 18b of FIG. 1.

The first and second ROMs 18a and 18b which are controlled by the external device control circuit 13 will be described in detail with reference to FIG. 6. Delayed flip-flops 51a to 51c are operative synchronously with the clock pulses $\phi 1$ and $\phi 2$. Set terminals R of the flip-flops 51a to 51c respectively receive the operation signal OP from the CPU 12 through an inverter 52. These flip-flops 51a to 51c are connected in series. Their outputs and the output from the inverter 52 are supplied to a data input terminal D of the flip-flop 51a. Further, the outputs from a NOR circuit 53 and the flip-flops 51a to 51c are supplied to AND circuits 54a to 54d, respectively. The AND circuits 54a to 54d commonly receive the clock pulse $\phi 1$ and their outputs are supplied as clock pulses $\phi A$ to $\phi D$ to registers 55a to 55d of 4-bit arrangement. The registers 55a to 55d receive data from the CPU 12 in response to the clock pulses $\phi A$ to $\phi D$. Each bit output from the register 55a is supplied to an AND circuit 58 through EX-OR circuits 56a to 56d and an NOR circuit 57. The EX-OR circuits 56a to 56d receive a code 90 assigned to each external device such as a code "1, 1, 1, 1" of the ROM 18a. When this code 90 coincides with a device code supplied from the CPU 12, the outputs from the EX-OR circuits 56a to 56d become all "0". As a result, the NOR circuit 57 outputs a signal of level "1" which is then supplied to the AND circuit 58. The AND circuit 58 also receives the output from the inverter 52 and the chip enable signal CE from the external device control circuit 13 of the CPU 12. The output from the AND circuit 58 is supplied to a ROM address counter 59 as a load signal. The ROM counter 59 also receives retaining address data of the registers 55b to 55d. The ROM counter 59 then loads the retaining data as column address data and produces row address data therein to access the addresses of a ROM 60. The ROM 60 prestores translation data in the corresponding memory areas and supplies memory data of 4 bits. This data is supplied to the CPU 12 through inverters 61 and gate circuits 62. The gate circuits 62 are controlled in response to the output from the AND circuit 58. The ROMs 18a and 18b have the particular device codes which correspond with each other and are operative in response to the corresponding device codes supplied thereto. Particular device codes are also assigned to the keyboard 11 and the display control unit 19. When a device code supplied to them coincides with the assigned device codes, these devices begin to operate.

Figure 7:
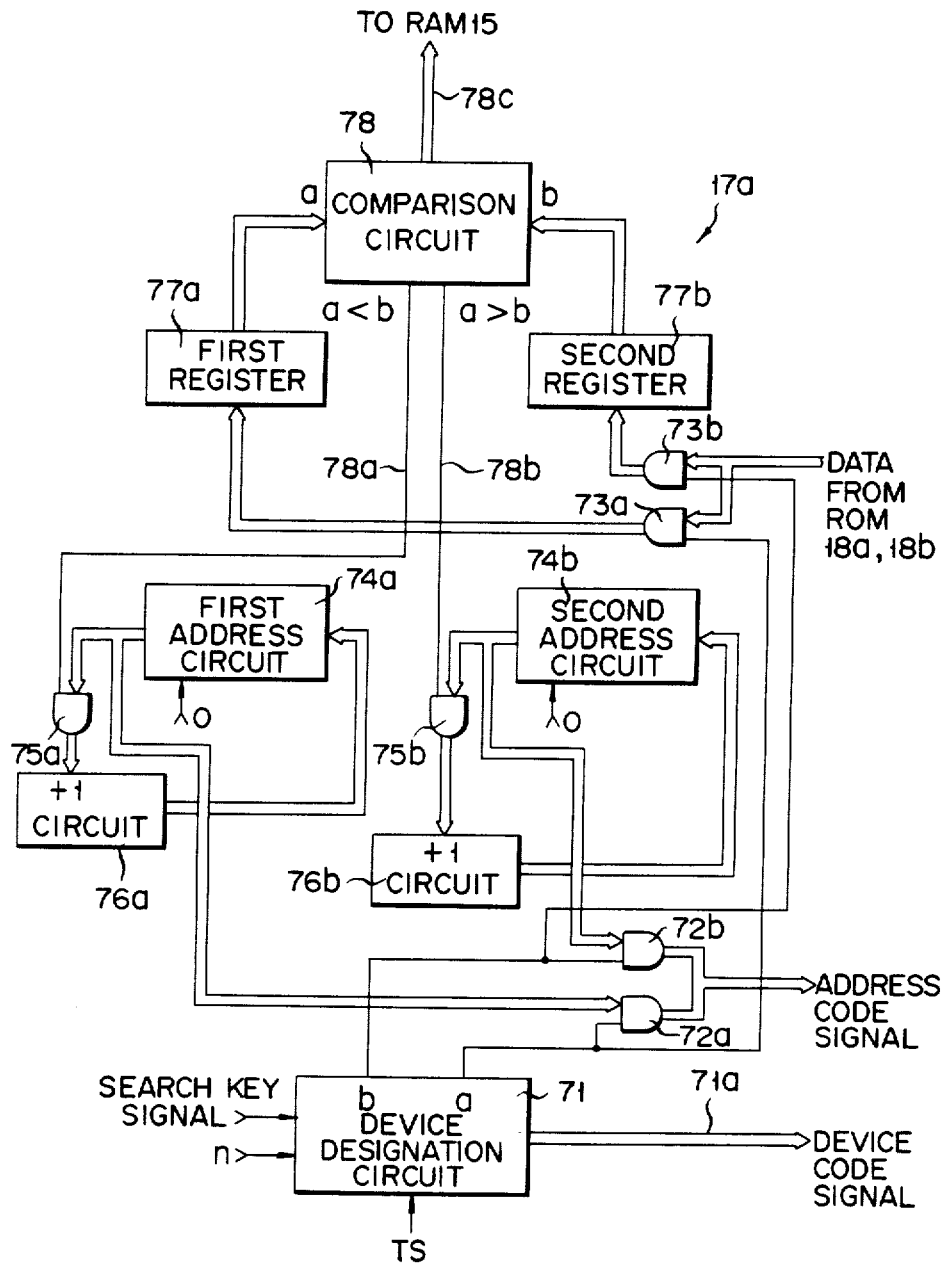
FIG. 7 is a detailed block diagram of a control circuit 17a of FIGS. 1 and 2.

The control stage 17a of the control circuit 17 in the CPU 12 will be described in detail with reference to FIG. 7. A device designation circuit 71 stores device codes which designate the first and second ROMs 18a and 18b. The device designation circuit 71 has output terminals a and b. When it receives a key input signal from the keyboard 11, the device designation circuit 71 supplies a device code of the first ROM 18a and then a device code of the second ROM 18b through an output line 71a in response to the timing signal Ts from the control stage 17b. Every time the search key is depressed, the device designation circuit 71 outputs a signal of level "1" alternately from the output terminals a and b. In particular, the device designation circuit 71 outputs the signal of level "1" from the output terminal a when the device code is supplied to the first ROM 18a. On the other hand, when the device code is supplied to the second ROM 18b, the device designation circuit 71 outputs the signal of level "1" from the output terminal b. The device designation circuit 71 stops operating when the data input inhibit signal n is supplied to it from the control stage 17b. The outputs from the output terminals a and b of the device designation circuit 71 are supplied to AND circuits 72a and 72b and AND circuits 73a and 73b. The AND circuits 72a and 72b also receive column address data for the first and second ROMs 18a and 18b from first and second address circuits 74a and 74b comprising registers. This column address data is then supplied to the registers of the external device control circuit 13 as shown in FIG. 4 and to the corresponding ROMs 18a and 18b. The initial column address of the first and second ROMs 18a and 18b is accessed when an initialize signal o is supplied from the control stage 17b to the address circuits 74a and 74b. The address circuits 74a and 74b are connected to +1 circuits 76a and 76b through the AND circuits 75a and 75b, respectively. When the AND circuits 75a and 75b are rendered conductive, address data is incremented by one. The contents of the address circuit 74a or 74b are selected by the AND circuit 72a or 72b. When the English translation mode is set, the contents are not modified. However, when the Japanese translation mode is set, the contents are modified according to the address table C of data B as shown in FIG. 3. The contents are supplied to the first and second ROMs 18a and 18b from the external device control circuit 13. Data read out from the ROMs 18a and 18b is selected by the AND circuit 73a or 73b and supplied to a first data register 77a or a second data register 77b. Data retained in the data registers 77a and 77b are compared in a comparator 78. The comparator 78 then supplies a signal of level "1" to the AND circuit 75a through an output line 78a if a code for characters of a word which is stored in the first data register 77a is smaller than another code for characters of another word stored in the second data register 77b. Otherwise, the comparator 78 supplies the signal of level "1" to the AND circuit 75b through an output line 78b. At the same time, the comparator 78 selects smaller data and supplies it to the RAM 15 of FIG. 1 through a data line 78c. Data stored in the RAM 15 is supplied to the display control unit 19 through the ALU 16, the control stage 17a and the external device control circuit 13. This data is displayed at the display section 24.

The mode of operation of the electronic translating apparatus according to this embodiment of the present invention will be described. To sequentially read out the contents of the ROMs 18a and 18b and display at the display section 24, the operator selects a desired translation mode from English to Japanese or from Japanese to English with the mode switch on the keyboard 11. He must then depress the search key. The search key input signal is supplied to the control stage 17b through the external device control circuit 13. This signal is then supplied to the RAM 15 which judges whether or not the input signal is the search key input signal. If it is judged to be the search key input signal, the control stage 17b controls to operate the device designation circuit 71 of FIG. 7. When the device designation circuit 71 receives the search key input signal, it generates a signal of "1" from the output terminal a in response to the timing signal Ts from the control stage 17b. The device designation circuit 71 outputs a device code, which selects the first ROM 18a, from the output line 71a. This device code is supplied to the external device control circuit 13 and loaded in the register 37a of FIG. 5. The AND circuit 72a is rendered conductive in response to the signal output from the output terminal a of the device designation circuit 71. The initial address data retained in the address circuit 74a is then output through the AND circuit 72a and modified in accordance with the translation mode. This modified data is then loaded in the registers 37b to 37d of the external device control circuit 13 shown in FIG. 5. When the external device control circuit 13 receives the external device designating signal 1 in response to the key-in operation, the flip-flop 31 is set. The signal of level "1" is then output from the flip-flop 31 and supplied to the flip-flop 32a in response to the clock pulses $\phi 1$ and $\phi 2$. At this time, the output from the flip-flop 32b is set to level "0". Thus, the output from the EX-OR circuit 33a is set to "1" and the gate circuit 38a is rendered conductive. The output from the AND circuit 41 is kept to level "1" and the gate circuit 40 is ON. The device code retained in the register 37a is supplied as data to the first and second ROMs 18a and 18b through the gate circuit 38a, the inverter 39 and the gate circuit 40, as shown in FIGS. 8A to 8H. When the output from the flip-flop 32a is set to level "1", the output from the flip-flop 32e is set to level "0". The output from the EX-OR circuit 33e is then set to level "1" and supplied to the first and second ROMs 18a and 18b as the operation signal OP, and as the chip enable signal CE through the OR circuit 34. Therefore, the data of level "1" retained in the flip-flop 32a serves to shift the flip-flops 32b to 32e synchronously with the clock pulses $\phi 1$ and $\phi 2$. With this shift, the signals of level "1" are sequentially output from the EX-OR circuits 33b to 33d and the gate circuits 38b to 38d are rendered conductive. As a result, column address data retained in the registers 37b to 37d is supplied to the first and second ROMs 18a and 18b in units of 4 bits. Finally, the signal of level "1" is supplied to the flip-flop 32e and the flip-flop 31 is reset. Further, the output from the EX-OR circuit 33e is set to level "1" and the operation signal OP and the chip enable signal CE are also set to level "0". When data transfer described above is completed, the data input instruction n is output from the control stage 17b and the flip-flop 35 is set. The output from the flip-flop 35 is set to level "1" and is supplied to the flip-flop 36 synchronously with the clock pulses $\phi 1$ and $\phi 2$. The output from the flip-flop 36 is supplied as the chip enable signal CE to the first and second ROMs 18a and 18b. At this time, since the operation signal OP is not output, the output of the inverter 42 is set to level "1". Therefore, when the chip enable signal CE is output, the output from the NAND circuit 41 is set to level "0" and the gate circuit 40 is turned off. Further, the output of the inverter 45 is set to level "1" and the gate circuits 44 are rendered conductive. Data stored in the first and second ROMs 18a and 18b is read out and displayed at the display section 24 through the display control unit 19.

On the other hand, when the first and second ROMs 18a and 18b are set in the waiting mode, the flip-flops 51a to 51c are set and their outputs are set to level "0". The inverter 52 outputs a signal of level "0" in response to the operation signal OP based on the external device designating signal 1 from the external device control circuit 13 of the CPU 12. The signal of level "1" is output from the NOR circuit 53 and supplied to the AND circuit 54a and the flip-flop 51a. The AND circuit 54a then outputs the clock pulse $\phi A$ synchronously with the next clock pulse $\phi 1$. The device code from the CPU 12 is loaded in the register 55a synchronously with the clock pulse $\phi A$. The output from the NOR circuit 53 is sequentially shifted in the flop-flops 51a to 51c in response to the clock pulses $\phi 1$ and $\phi 2$. The outputs from the flip-flops 51a to 51c are supplied to the AND circuits 54b to 54d respectively. In response to the data shift of the flip-flops 51a to 51c, the AND circuits 54b to 54d output the clock pulses $\phi B$, $\phi C$ and $\phi D$, respectively, in synchronism with the clock pulse $\phi 1$. The contents of the registers 37b to 37d which are supplied from the external device control circuit 13 are supplied to the registers 55b, 55c and 55d synchronously with the clock pulses $\phi B$, $\phi C$ and $\phi D$. When the data transfer as described above is completed, the operation signal OP is set to level "0" and the output from the inverter 52 is then set to level "1". Thus, the flip-flops 51a to 51c are set and the clock pluses $\phi A$ to $\phi D$ are not generated.

Figure 8:
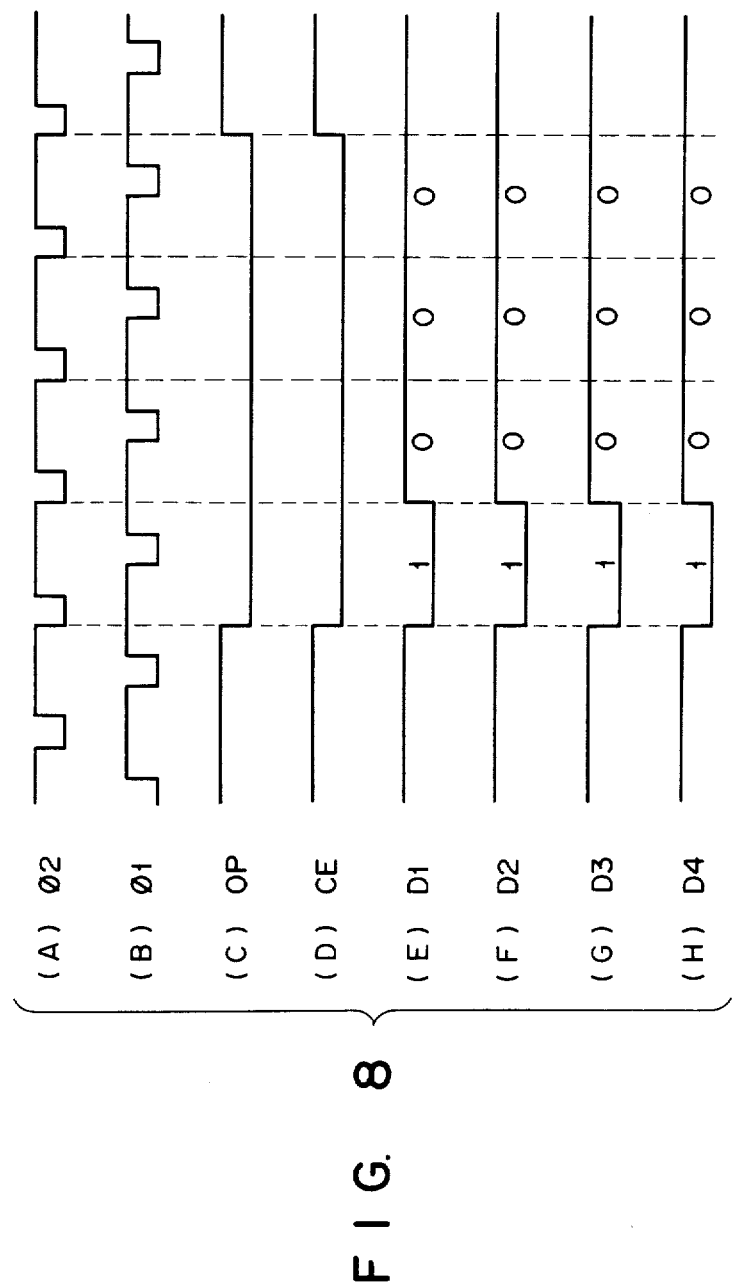
FIGS. 8A to 8H are timing charts of signals and data for explaining the mode of operation of the electronic translating apparatus when the ROM is specified as an external circuit.
Figure 9:
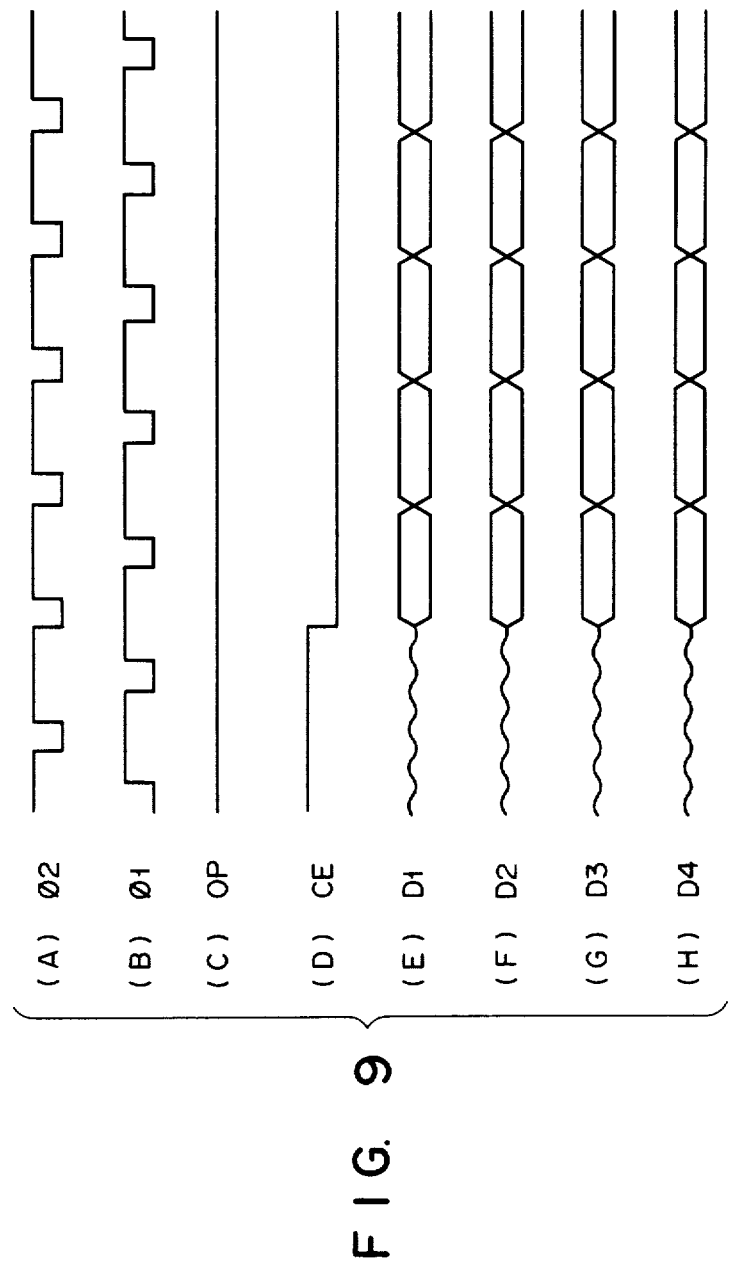
FIGS. 9A to 9H are timing charts of signals when data is read out from the first and second ROMs 18a and 18b, respectively.
Figures 10, 12:
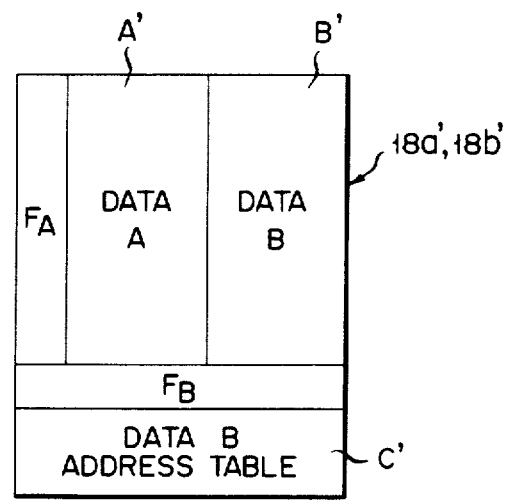
FIG. 10 is a view of an example of Japanese words stored in the first and second ROMs 18a and 18b.
FIG. 12 is a view showing flag areas formed in an English data area and a Japanese data area of the first and second RAMs 18a' and 18b'.

Thereafter, when the chip enable signal CE is output in response to the data input signal m from the external device control circuit 13 of the CPU 12, as shown in FIGS. 9A to 9H, the output from the NOR circuit 57 of the first ROM 18a is set to level "1". The output from the AND circuit 58 is then set to level "1" and the gate circuit 62 is rendered conductive. At the same time, the load signal is supplied to the address counter 59. Address data retained in the registers 55b and 55c is loaded in the address counter 59. As shown in FIG. 8, loaded data is defined as the initial column address. The address counter 59 then sequentially counts up the row address synchronously with the clock pluses $\phi 1$ and $\phi 2$ and accesses the column and row addresses of the ROM 60. Thus, data for one column is read out from the ROM 60. As shown in FIG. 10, codes corresponding to Japanese words such as 1 "ai (love)", 2 "aida (duration, gap)", 3 "aidano (between)" and so on are stored in one column of the Japanese word region of the first ROM 18a, while codes corresponding to Japanese word, such as 1 "aisatsu (greeting)", 2 "aisatsusuru (greet)", 3 "aisuru (love as a verb)" and so on are stored in one column of the Japanese word region of the second ROM 18b. First data "ai" of 4 bits is read out from the first ROM 18a by accessing the corresponding address. This data is sequentially supplied to the external device control circuit 13 of the CPU 12 through the gate circuit 62.

In the data input mode, the CPU 12 functions to interrupt the output of the inverter 42 in response to the operation signal OP. The output from the NAND circuit 41 is set to level "0" and the gate circuit 40 is turned off. The gate circuits 44 are rendered conductive in response to the output from the inverter 45. Data supplied from the first ROM 18a is supplied to the CPU 12 through the inverters 43 and the gate circuits 44. This data is supplied to the control stage 17a shown in FIG. 6. At this time, since the signal output from the output terminal a of the device designation circuit 71 is supplied to the AND circuit 73a, data from the first ROM 18a is supplied to the data register 77a through the AND circuit 73a.

When data readout from the first ROM 18a is completed, the timing signal Ts is supplied from the control stage 17b to the device designation circuit 71. Thus, the signal of level "1" is output from the output terminal b of the device designation circuit 71 and the device code which selects the second ROM 18b from the output line 71a in response to the search key input signal. As a result, the AND circuit 72b is rendered conductive and the column address data retained in the address circuit 74b is output through the AND circuit 72b. This data is modified in accordance with the translation mode and loaded together with the device code in the registers 37a to 37d in the external device control circuit 13. Based on the data loaded in these registers, data "aisatsu (greeting)" at the initial address of the Japanese word region of the second ROM 18b is read out in the same manner as described above and transferred to the CPU 12. This data is supplied to the control stage 17a through the external device control circuit 13 of the CPU 12 and stored in the data register 77b through the AND circuit 73b. When the data readout as described above is completed, the data input inhibit signal n is supplied from the control stage 17b to the device designation circuit 71. Thus, the signal output operation of the device designation circuit 71 is interrupted. Further, the comparator 78 is rendered conductive and compares the codes of the characters of words which are stored in the data registers 77a and 77b. Data stored in the first and second ROMs 18a and 18b has codes in the order of the kana syllabary. The code of data "ai" is smaller than that of data "aisatsu". Thus, the comparator 78 outputs the signal of level "1" from the output line 78a and the AND circuit 75a is rendered conductive. The column address data stored in the address circuit 74a is incremented in the +1 circuit 76a. At the same time, the comparator 78 selects small data, that is, data "ai" stored in the data register 77a and supplies it to the RAM 15 from the data line 78c. Data "ai" stored in the RAM 15 is supplied to the display control unit 19 through the external device control circuit 13 and displayed at the display section 24.

When the operator depresses the search key while data "ai" is being displayed, the first and second ROMs 18a and 18b are alternately selected by the device designation circuit 71. The storage contents are read out according to address data stored in the address circuits 74a and 74b and stored in the data registers 77a and 77b. As the contents of the address circuit 74a are incremented by one, the next data "aida" is read out from the first ROM 18a and stored in the data register 77a. On the other hand, as the contents of the address circuit 74b are not modified, the same data "aisatsu" is read out from the second ROM 18b and stored in the data register 77b. The codes of data "aida" and data "aisatsu" are compared by the comparator 78. The code of data "aisatsu" is smaller than that of data "aida". Therefore, the signal of level "1" is output from the output line 78b of the comparator 78 and the AND circuit 75b is rendered conductive. The contents of the address circuit 74b are incremented by one by the +1 circuit 76b. Simultaneously, for the next comparison, data "aisatsu" stored in the data register 77b is output from the data line 78c and stored in the RAM 15. This data is supplied to and displayed at the display section 24 as described above.

Subsequently, every time the search key is operated, the contents of the first and second ROMs 18a and 18b are alternately read out according to address data retained in the address circuits 74a and 74b. Smaller codes are first displayed. In other words, words in the order of the kana syllabary are sequentially displayed. When the operator depresses the translation key when a desired word is displayed, an English word corresponding to the displayed Japanese word is displayed at the display section 24. The translation mode from English to Japanese can be set in the same manner as described above.

In the above embodiment, each data is read out from the first and second ROMs 18a and 18b with the search key as described. However, a desired word may be entered with the keyboard 11 and this word may be translated. In this case, after word data is entered, the translation key also functions as the search key. When the operator depresses the translation key, the storage contents of the first and second ROMs 18a and 18b are sequentially read out. When readout data and input data coincide, corresponding translation data may be read out from the first and second ROMs 18a and 18b and displayed at the display section.

Further, in the above embodiment, the second ROM 18b is defined as an extended memory. However, when only the first ROM 18a is used, data of all "1" which is the maximum data may be written in the second data register 77b and the storage contents of the first ROM 18a may be searched in the order of words in a dictionary and displayed at the display section.

Also, in the above embodiment, the first and second ROMs 18a and 18b are searched in the order of words in the dictionary. However, this search mode may be applied to a number of ROMs.

Further, in the above embodiment, a smaller code between codes from the first and second ROMs 18a and 18b is selected. However, a larger code may be selected in accordance with the reverse search mode.

Figure 11:
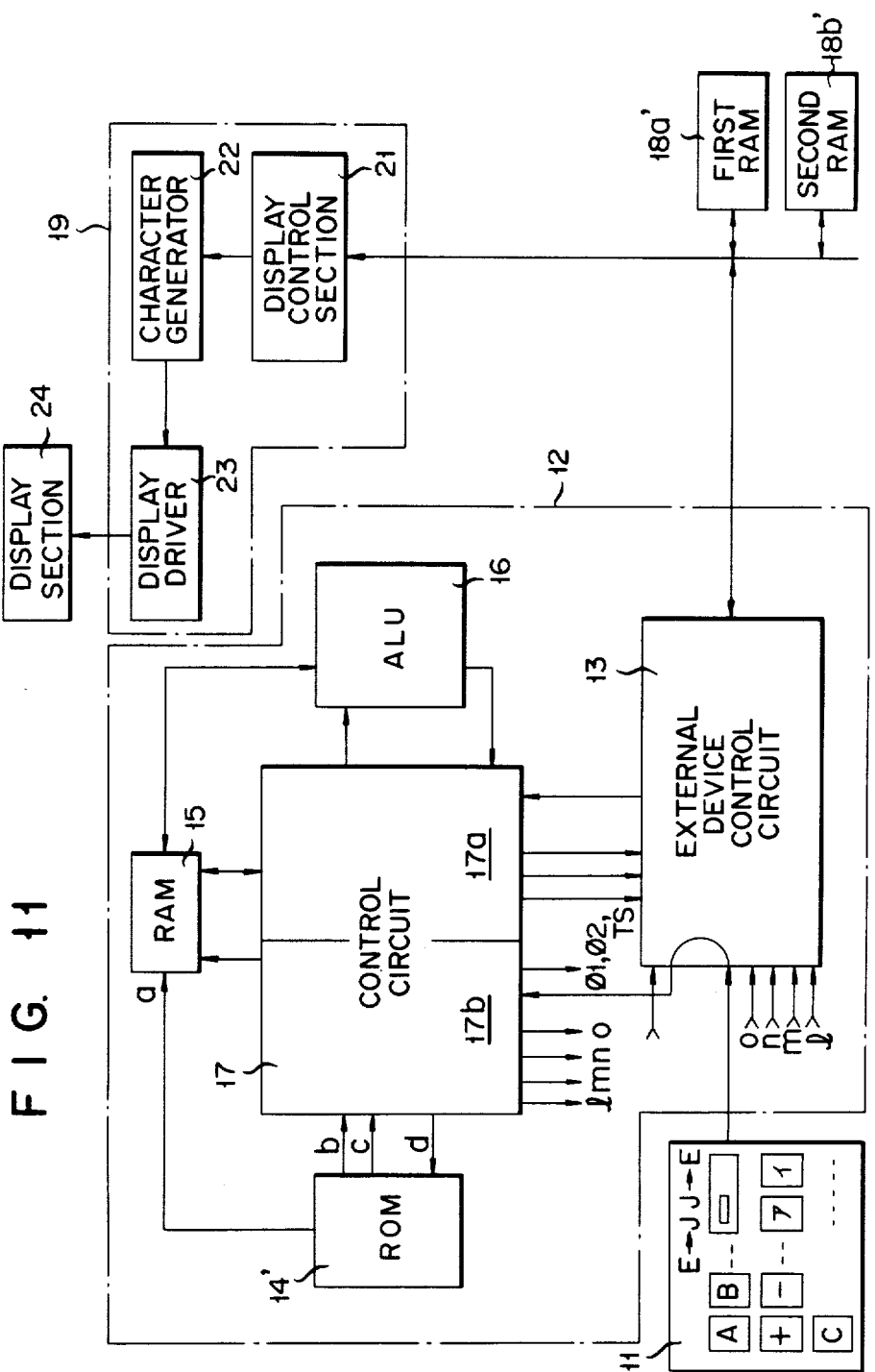
FIG. 11 is a block diagram of an electronic translating apparatus which has first and second RAMs 18a' and 18b' in place of the ROMs 18a and 18b of FIG. 1 according to another embodiment of the present invention.

An electronic translating apparatus according to another embodiment of the present invention will be described with reference to FIGS. 11 and 12. The electronic translating apparatus according to the second embodiment is the same as that according to the first embodiment except that first and second RAMs 18a' and 18b' are used in place of the first and second ROMs 18a and 18b of FIG. 1 and a ROM 14' is used in place of the ROM 14.

Referring to FIG. 12, each of the first and second RAMs 18a' and 18b' consists of a first memory region which stores English data A', a second memory region which stores Japanese data B' and a third region which stores an address table C' of Japanese data B' in the same manner as the first and second ROMs 18a and 18b. However, the first and second RAMs 18a' and 18b' each have a flag region FA for English data and a flag region FB for Japanese data.

In the second embodiment, the dictionary memory comprises programmable RAMs. Therefore, the operator can store desired words and erase words which are already learned or memorized.

The flag corresponding to the stored word is set to "1" and the flag corresponding to the erased word is set to "0". Therefore, the operator only searches for words the flags of which are set to "1".

The basic mode of operation of the electronic translating apparatus of the second embodiment is the same as that of the first embodiment. However, in the second embodiment, as data is written in or erased from the RAMs, decoders are arranged in the first and second RAMs 18a' and 18b'. Data output from the lines D1 to D4 in response to the operation signal OP from the CPU 12 is decoded. Thus, the read/write operation is controlled. The method for controlling the read/write operation and address designation is known, and a detailed description thereof is omitted. To protect the stored contents of the RAM, a dry cell may be arranged to back up the memory. The flag areas FA and FB are formed in the RAMs 18a' and 18b' in FIG. 12. However, these may be formed in the RAM 15 of FIG. 11.

When new words are to be added and old words are to be erased, the flag of the word is frequently set to "0" or "1". However, the words are searched in the order of words in the dictionary, resulting in convenience.

What is claimed is:

1. An electronic translating apparatus with an extended memory, comprising:
   a basic memory for storing in a predetermined order a number of codes corresponding to words in a translation dictionary;
   an extended memory which is physically separate from said basic memory and which stores in a predetermined order codes corresponding to words different from the codes stored in said basic memory;
   address designating means, coupled to said basic memory and to said extended memory, for designating addresses of said basic memory and said extended memory and for reading out the codes of words at the designated addresses;
   comparing means coupled to said basic memory and to said extended memory, for comparing the codes of words read out by said address designating means from said basic memory and extended memory, respectively;
   selecting means coupled to said comparing means, for selecting one of the codes of the words compared by said comparing means according to the order in which the words would be listed in a translation dictionary;
   converting means, connected to said selecting means, for converting said selected codes of the words into visual patterns; and
   displaying means coupled to said converting means for displaying said visual patterns.

2. An apparatus according to claim 1, wherein said extended memory comprises a ROM.

3. An apparatus according to claim 1, wherein said extended memory comprises a RAM.

4. An apparatus according to claim 1, wherein said selecting means includes means for selecting the code of one word from the compared codes of the words according to the reverse order of the translation dictionary.

5. An electronic translating apparatus with an extended memory, comprising:

memory means including a basic memory and an extended memory, said basic memory having a predetermined area in which codes of words are written, for storing in a predetermined order a number of codes corresponding to words which constitute a translation dictionary and said extended memory having a predetermined area for writing codes of words therein, said extended memory being physically separate from said basic memory for storing in a predetermined order codes corresponding to words different from the codes stored in said basic memory, at least one of said basic memory and said extended memory including a read/write memory in which a number of codes of words can be stored in a predetermined order;

writing means, connected to said read/write memory, for writing the codes of words into said read/write memory;

address designating means coupled to said basic memory, said extended memory and to said read/write memory, for designating addresses of said basic memory and said extended memory to read out the codes of words at the designated addresses;

comparing means coupled to said basic memory and to said extended memory for comparing the codes of words read out from said basic memory with those read out from said extended memory by said address designating means;

selecting means coupled to said comparing means, for selecting one of the codes of the words compared by said comparing means according to the order in which the words would be listed in the translation dictionary; and means, connected to said selecting means, for displaying the word of a selected code.

6. An electronic translating apparatus with an extended memory, comprising:

a basic memory for storing in a predetermined order a number of codes corresponding to words in a translation dictionary;

an extended memory which is physically separate from said basic memory and which stores in a predetermined order codes corresponding to words different from the codes stored in said basic memory;

address designating means coupled to said basic memory and to said extended memory, for designating addresses of said basic memory and said extended memory and for reading out the codes of words at the designated addresses;

comparing means coupled to said basic memory and to said extended memory, for comparing the codes of words read out by said address designating means from said basic memory and said extended memory, respectively; and selecting means coupled to said comparing means, for selecting one of the codes of the words compared by said comparing means according to the order in which the words would be listed in the translation dictionary.

* * * * *